United States Patent
Whyte

(10) Patent No.: US 7,240,912 B2
(45) Date of Patent: Jul. 10, 2007

(54) BICYCLE REAR SUSPENSION

(75) Inventor: Jon Frank Ross Whyte, Gretton (GB)

(73) Assignee: ATB Sales Limited, East Sussex (GB)

( * ) Notice: Subject to any disclaimer, the term of this patent is extended or adjusted under 35 U.S.C. 154(b) by 0 days.

(21) Appl. No.: 11/188,793

(22) Filed: Jul. 26, 2005

(65) Prior Publication Data
US 2006/0022428 A1  Feb. 2, 2006

(30) Foreign Application Priority Data
Jul. 27, 2004  (GB) ................. 0416721.9

(51) Int. Cl.
*B62K 25/20* (2006.01)
(52) U.S. Cl. .................................. 280/284
(58) Field of Classification Search ........... 280/284, 280/285, 286
See application file for complete search history.

(56) References Cited

U.S. PATENT DOCUMENTS

| | | | |
|---|---|---|---|
| 5,678,837 A | 10/1997 | Leitner | |
| 6,161,858 A * | 12/2000 | Tseng | 280/281.1 |
| 6,206,397 B1 | 3/2001 | Klassen et al. | |
| 6,845,998 B2 * | 1/2005 | Probst | 280/284 |

FOREIGN PATENT DOCUMENTS

| | | |
|---|---|---|
| DE | 4435482 A1 | 4/1996 |
| EP | 1026073 A1 | 8/2000 |
| FR | 2774966 A1 | 8/1999 |
| GB | 2381510 | 1/2004 |

\* cited by examiner

*Primary Examiner*—Kevin Hurley
(74) *Attorney, Agent, or Firm*—Sughrue Mion, PLLC

(57) ABSTRACT

A bicycle comprises a frame, a rear wheel and a rear suspension which comprises a swing arm carrying the wheel and two pivot links pivotably connected at respective pivot points with the frame and at respective pivot points with the arm so as to form, together with parts of the frame and arm, a four-bar linkage. The suspension further comprises a spring and damper unit pivotably connected with the frame at the pivot point of one link and with the arm at the pivot point of the other link so as to extend diagonally of the linkage and provide springing and damping of the suspension travel. The shared use of the link pivot points by the spring and damper unit serves to reduce construction and assembly costs as well as weight. One link is disposed forwardly of the other link with respect to the fore and aft direction of the bicycle so as to ensure lateral rigidity of the rear suspension.

14 Claims, 2 Drawing Sheets

BICYCLE REAR SUSPENSION

FIELD OF THE INVENTION

The present invention relates to a bicycle and has particular reference to a rear wheel suspension in a bicycle.

BACKGROUND OF THE INVENTION

Bicycles intended for off-road and other rough terrain uses commonly have rear suspensions permitting sprung movement of the rear wheel relative to the bicycle frame. Suspensions of this kind have been developed to the level of multi-link systems, particularly four-bar linkages in which a rearwardly extending swing arm carrying the rear wheel is connected to a seat tube and/or down tube of the bicycle frame by way of pivot links. The swing arm, links and part of the tube or tubes form the elements of the linkage. The linkage geometry can be such as to not only provide effective wheel travel in response to the loads imposed by travel over uneven ground, but also to counteract a cyclic up-and-down motion or 'bobbing' effect of the rear suspension which otherwise arises as a reaction to and synchronous with the periodic power strokes transmitted to the pedal cranks of the bicycle. Examples of known four-bar linkage suspension systems include those disclosed in U.S. Pat. Nos. 5,678,837, 6,206,397, EP 1 026 073, GB 2 381 510 and FR 2774966.

Springing and shock absorption in such multi-link systems is commonly provided by a spring and damper unit. Units of this kind usually consist of a telescopic shock absorber located within and coaxial with a coil spring. Other forms of unit are equally possible including an integrated air spring and pneumatic shock absorber. The unit is normally coupled to the swing arm and the bicycle frame at respective pivot points selected to optimise the action of the unit, i.e. its influence on suspension travel. The end positions of the suspension travel are defined by settings of maximum compression and maximum extension of the unit. Such units function satisfactorily, but can, on occasions, be complicated to incorporate in a bicycle, sometimes to the extent of necessitating adaptation of the frame structure to accommodate the unit and its mountings. Weight and cost penalties result from the multiplicity of mountings for the unit and the various elements of the suspension linkage.

One approach to simplification of the mounting of a rear spring and damper unit in a bicycle is represented by the various constructions shown in DE 44 35 482, in which the embodiments of FIGS. 2 and 3 depict a spring and damper unit sharing the pivot points of pivot links which couple a rear wheel swing arm to a frame and which form, together with the frame and swing arm, a four-bar linkage. However, in the illustrated constructions the two links overlap in vertical direction entirely in the case of FIG. 3 and almost entirely in FIG. 2, with the consequence that the lateral rigidity of the linkage is compromised. Two nearly vertical lines of flexure run through, respectively, the forward pivot points of the links and the rearward pivot points of the links so that, with the additional load imposed by the shared coupling of the spring and damper unit, the rear suspension has only a limited capability of providing resistance to forces tending to deflect the rear wheel laterally relative to the frame. The solutions offered by DE 44 35 482 are therefore at the expense of the capability of the rear suspension to withstand critical deflections that can readily upset the tracking and poise of the bicycle.

It is therefore the principal object of the present invention to provide a bicycle with a rear suspension in which a spring and damper unit can be employed in association with a four-bar linkage with some mitigation of the above-mentioned weight and cost disadvantages, but without detracting from control of wheel travel and capability to accept the suspension loads encountered in normal use.

A subsidiary object is provision of a bicycle with sensitive components of a rear suspension located in a position having a degree of protection from mud and other contaminants thrown up by front and rear wheels of the bicycle.

Yet another subsidiary object is incorporation of an adjustment facility of simple design in a bicycle rear suspension to enable adjustment of the bicycle ride height.

Other objects and advantages of the invention will be apparent from the following description.

SUMMARY OF THE INVENTION

According to the present invention there is provided a bicycle comprising a frame, a rear wheel and a rear suspension which comprises a swing arm carrying the wheel, two pivot links pivotably connected at respective pivot points with the frame and at respective pivot points with the arm to form together with the frame and the arm a four-bar linkage, and a spring and damper unit pivotably connected with the frame at the pivot point of one of the links and with the arm at the pivot point of the other one of the links to so extend diagonally of the linkage as to influence relative movement of the frame and arm, one link being disposed forwardly of the other link with respect to the fore and aft direction of the bicycle.

In the case of a bicycle embodying the present invention, pivot points for the spring and damper unit and the elements of the linkage are shared, with the result that only four pivot points are required. This produces savings in weight and cost with respect to pivot point components, but because one link is disposed forwardly of the other link, i.e. the links do not overlap in the fore and aft direction of the bicycle, the four pivot points of the links are spaced apart in that direction and the rear suspension does not suffer any reduction in its capability to resist lateral deflection of the wheel. Adaptation of the frame structure is not necessary, in particular it is possible to use a conventional frame triangle with a straight, uninterrupted seat tube. The spring and damper unit is, moreover, accommodated within the space enclosed by the elements of the linkage, which provides a compact layout without intrusion of the unit into areas where it might represent an obstruction.

Preferably, the particular link sharing its pivot point at the frame with the spring and damper unit is that disposed forwardly of the other link with respect to the fore and aft direction of the bicycle. However, subject to an appropriate configuration of the linkage and/or spring and damper unit, such as use of a pull-type unit, the link sharing its frame pivot point with the unit can be located rearwardly of the other link, i.e. the forwardly disposed link is then that sharing its arm pivot point with the unit.

Each of the pivot points preferably comprises a single continuous pivot pin, which can pass through bearing bores in—as the case may be—the arm, links, frame and spring and damper unit. A high level of commonality of pivot components can be achieved, particularly if the pivot pins are substantially identical and, for example, associated with identical plain, ball or roller bearings. In addition, the links themselves can be substantially identical, in each instance preferably consisting of two substantially parallel arms. The parallel arms enhance lateral stiffness of the suspension and accommodate the spring and damper unit therebetween, so as to allow a symmetrical arrangement in which the unit is in a central position.

For preference, the links and the spring and damper unit are disposed substantially in a space partly or fully enclosed by the frame. Such a space can be, for example, a recess in a monocoque frame or, if the frame comprises a down tube and a seat tube, a region between the tubes. Location of the links and the spring and damper unit within such a space, for example an angular region between the down and seat tubes, provides a degree of protection of these components and the associated pivot pins and bearings from direct exposure to mud splash from the wheels. In addition, location of the links and unit in the mentioned space and thus above the chain wheel and pedal cranks normally mounted at a junction of the seat tube and down tube allows space for use of relatively wide links, which increases overall stiffness of the linkage.

With advantage, the pivot points at the frame are disposed on a bridge member extending between the down and seat tubes. Such a bridge member, apart from providing a simple and convenient mounting location for the frame pivot points, makes a significant contribution to the stiffness of the frame, notably in an area which is highly loaded.

It can also be of advantage for the rear suspension to have a capability of adjustment to vary the ride height of the bicycle to more readily cope with different degrees of terrain roughness and differing rider weights. For this purpose, the particular link pivot point, which is not shared with the spring and damper unit, at the frame is preferably adjustable in an arc about the frame pivot point of the other link. The arcuate adjustment can be achieved by sliding engagement of a pivot pin of the pivot point within a slot and fixing the pin in a selected position in the slot. By contrast, in the case of known rear suspensions with four-bar linkage it may be necessary to provide two such adjustment slots respectively for a link pivot point and a separate spring and damper unit pivot point.

In relation to control of wheel travel and spring and damping effect during suspension movement, particularly compression of the four-bar linkage, the linkage is preferably so arranged that an instantaneous pivot centre thereof defined by an intersection of two axes each containing the pivot points of a respective one of the links moves on a curved path initially downwardly and rearwardly and subsequently upwardly and rearwardly with respect to the fore and aft direction of the bicycle during movement of the linkage from an end setting in an unloaded state of the suspension to an end setting in a loaded state of the suspension. This locus of the instantaneous pivot centre can be achieved if, for example, the forwardly disposed link during movement of the linkage from the unloaded end setting to the loaded end setting the forward link executes an overcentre motion to cause a forward end of the swing arm to move upwardly and then downwardly. Due to this overcentre movement and subsequent raising of the swing arm forward end, the wheel to spring/damper ratio is increased as the suspension approaches the upper end of its travel, so as to compensate for a decrease in the ratio which might otherwise occur in the event of use of, for example, a conventional spring and damper unit of a particular length and stroke. The upward movement of the instantaneous pivot centre towards the end of the upward travel of the linkage causes an increase in chain growth, i.e. increase in the length of a drive run of the chain, in the final stage of the suspension travel, although this increase occurs at a time when the rider is less likely to be exerting a strong driving action, namely at a time when the suspension is almost under full compressive deflection. Consequently, the disposition of the links and the resulting locus of the instantaneous pivot centre represent a compromise providing satisfactory wheel control in conjunction with the advantageous location of the spring and damper unit on a diagonal of the four-bar linkage.

To assist attainment of the desired locus of the instantaneous pivot centre, the links preferably extend convergently in a direction downwardly away from the swing arm, the angle of convergence ultimately determining the position of the instantaneous pivot center.

Preferably, the locus of the axis of the rear wheel during movement of the linkage from the end setting in the unloaded state to the end setting in the loaded state has the form of a curve with a radius which is greater in the latter end setting than in the former end setting. This particular locus has the effect of inducing chain growth relatively rapidly in an initial phase of upward travel of the rear wheel.

An embodiment of the present invention will now be more particularly described by way of example with reference to the accompanying drawings.

DESCRIPTION OF THE PREFERRED EMBODIMENT

Figure 1:
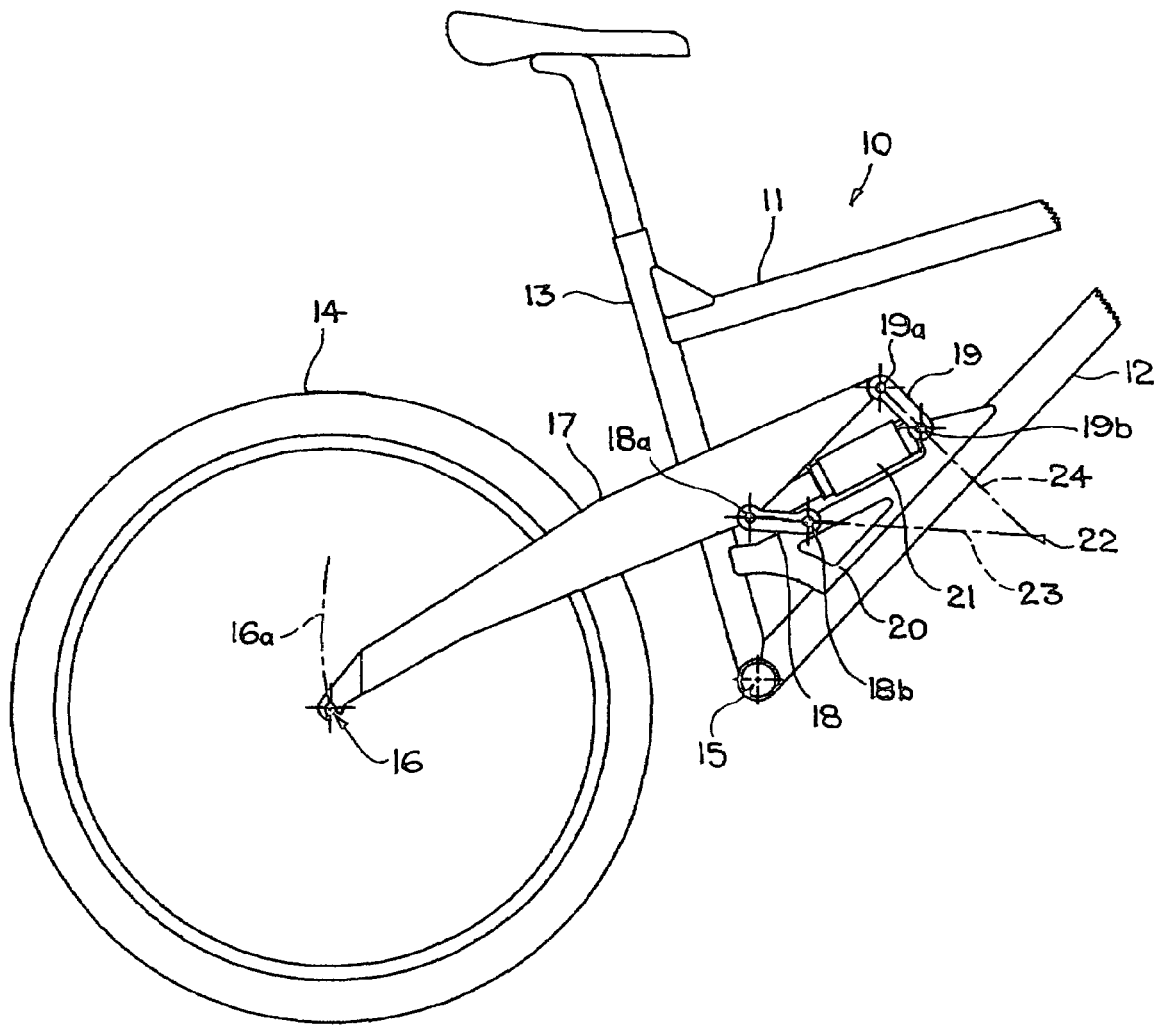
FIG. 1 is a schematic elevation of the rear part of a bicycle embodying the invention.

Referring now to the drawings there is shown part of a bicycle, for example a bicycle intended for off-road use ("mountain" bicycle), comprising a frame 10 with a crossbar 11, down tube 12 and seat tube 13. The crossbar 11 and down tube 12 may be united into a single component to the right of FIG. 1 and, whether so united or remaining separate, are connected to a steering assembly and front wheel forks or suspension (not shown) of the bicycle. At the junction of the down tube 12 and seat tube 13 there is provided a bearing location for a pedal crank drive fixedly connected with a drive sprocket of a chain-and-sprocket drive transmission (not shown) to a rear wheel 14 of the bicycle. A driven sprocket of the transmission is fixedly connected with an axle of the rear wheel and drive is transmitted from the drive sprocket to the driven sprocket by way of an endless chain. In the case of a drive transmission provided with gearing, several coaxial drive or driven sprockets of respectively different diameter may be provided together with a chain displacing device (derailleur mechanism) for displacing the chain between the sprockets of different diameter. Pedal crank drives and chain-and-sprocket drive transmissions are conventional components of bicycles and accordingly are not illustrated in FIG. 1. However, the axis of the pedal crank drive and drive sprocket(s) is denoted by 15 and the axis of the rear wheel axle and the drive sprocket(s) by 16.

The rear wheel 14 is suspended by a rear suspension comprising a swing arm 17 which carries an axle rotatably mounting the rear wheel and two short pivot links 18 and 19 respectively disposed rearwardly and forwardly with respect to the fore-and-aft direction of the bicycle and coupling the arm 17 to the frame 10 to form, together with a part of the frame, a four-bar linkage. The links 18 and 19 extend convergently away from the arm 17 in downward direction and are pivotably connected therewith at respective pivot points 18a and 19a and to the frame at respective pivot points 18b and 19b.

The swing arm is fabricated from sheet aluminium or aluminium alloy, but could equally well be cast, forged, moulded or constructed in any other suitable manner and can be made from any appropriate material or materials. It is generally straight, but tapers towards its ends. The links 18 and 19 each consist of two parallel arms (only one of which is visible in the drawings) machined from aluminium, aluminium alloy, steel or other material or made by forging, casting, stamping, fabricating, moulding or any other suitable method from metallic or other appropriate material or materials, preferably a material combing high strength with light weight. The arms making up the links 18 and 19 can be of cost-saving identical construction with a slightly asymmetrical shape as depicted in FIG. 1, the arms of the link 18 being reversed relative to those of the link 19. The pivot points 18a, 19b, 19a, 19b are each provided by a single pivot pin engaged by way of plain bearings, such as bronze bushes, and/or roller or ball bearings in bores in the arm 17, frame 10 and links 18 and 19. The pivot pins can again be of identical construction and can be rotatable or fixed relative to the arm, frame and/or links depending on the type and disposition of the bearings.

As apparent from, in particular, FIG. 1, the pivot points 18b and 19b at the frame are provided at a shaped bridge member 20 extending between and rigidly secured to the down tube 12 and seat tube 13 above the junction of the tubes in the region of the axis 15. This disposition of the bridge member, which has the advantage of reinforcing the tube junction and thus imparting additional stiffness to the frame 10 as a whole, allows the links 18 and 19 to be accommodated in the triangular area enclosed by the crossbar 11, down tube 12 and seat tube 13. The links and their associated pivot points are located well above the drive transmission, inclusive of gearing components if present. This permits the swing arm 17 to have a relatively simple, straight construction free of bends to clear the transmission and additionally makes possible a relatively wide construction of the arms forming the links 18 and 19 so as to impart maximum strength in bending. Moreover, location of the links and pivot points in the space between the down tube 12 and seat tube 13 provides a degree of protection of these components, particularly bearing surfaces and/or bearing balls and rollers, from water and other detritus thrown up by either of the bicycle wheels.

The rear suspension additionally incorporates a spring and damper unit 21, such as a coaxial helical compression spring and hydraulic damper or an integral air spring and pneumatic damper, arranged within the space encompassed by the four-bar linkage itself. In particular, the unit 21 extends on a diagonal of the linkage, more specifically the diagonal between the pivot points 18a and 19b, and is pivotably connected with the arm 17 and the frame 10 by way of these pivot points. The spring and damper unit 17 thus shares with the links 18 and 19 the pivot pins at the points of connection of the link 18 with the arm 17 and the link 19 with the frame 10. Separate pivot points, inclusive of respective pivot pins and bearings, for the unit 21 are thus eliminated, with the consequence of reduced weight and lower construction and assembly costs. The unit 21 engages between the arms forming the links 18 and 19 and can also nest in part in recesses in the arm 17 and the bridge member 20. The arrangement of the unit 21 is thus economic in terms of both space utilisation and component costs. The central disposition of the unit 21 in alignment with the swing arm 17 and between the arms of the links 18 and 19 achieves a symmetrical arrangement with good distribution of forces to the various elements and good resistance to lateral flexing of the linkage. Resistance to flexing is promoted by the short and wide shape of the arms of the links, as well as their spacing along the swing arm.

The rear suspension can also include a facility for adjustment of the ride height of the bicycle. For this purpose, the pivot pin of the rearward pivot point 18b at the frame can be located in an arcuate slot centred on the axis of the forward pivot point 19b at the frame. The ride height is changed by movement of the pin upwardly or downwardly in the slot and fixing the pin in a selected position. Corresponding adjustment of a separate pivot point for the spring and damper unit 21, as may be necessary in prior art configurations, is not required.

As is evident from FIG. 1, the swing arm 17, under the control of the remaining elements of the four-bar linkage, is able to pivot upwardly in response to bumps encountered by the rear wheel 14 during use of the bicycle. In particular, the linkage is able to move between a first end setting in an unloaded state of the bicycle, thus with the rear wheel in a lowermost position, and a second end setting in a fully loaded state of the bicycle, thus with the rear wheel in an uppermost position. The locus of the axis 16 of the rear wheel 14 during this movement of the linkage is denoted by 16a, this locus having the form of a curve with a radius which is greater in the second end setting than in the first end setting and which, for preference, substantially continuously increases during the movement from the first to the second end setting. The end settings are defined by, respectively, maximum extension and maximum compression of the spring and damper unit 21. The lengths, relative dispositions and orientations of the links 18 and 19 are such that during travel of the linkage from the first end setting to the second end setting the rearward link 18 pivots upwardly (at its rearward end) in the course of an initial phase of such travel while the forward link 19 pivots upwardly (also at its rearward end) during the same phase. In the course of a further and final phase of such travel the rearward link 18 continues to pivot upwardly while the forward link 19 passes through a vertical or centre orientation and now pivots downwardly. The forward link thus executes an over-centre action. This movement of the links 18 and 19 produces a shift in the instantaneous pivot centre of the linkage and consequently a controlled displacement of the swing arm 17 and rear wheel 14 to lessen the bobbing effect induced in the chain-and-sprocket transmission by the power stroke exerted via the pedal crank drive by the rider of the bicycle. The instantaneous pivot centre, which is denoted by 22 in FIG. 1, is defined by the point of intersection of an axis 23 containing the pivot points 18a and 18b of the rearward link 18 and an axis 24 containing the pivot points 19a and 19b of the forward link 19.

Figure 2A:
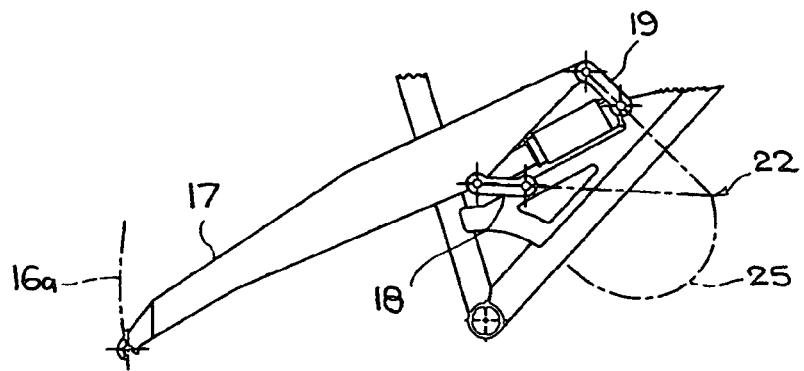
FIGS. 2a–e are schematic diagrams showing five progressive stages of movement of a rear suspension in the bicycle part illustrated in FIG. 1.
Figure 2B:
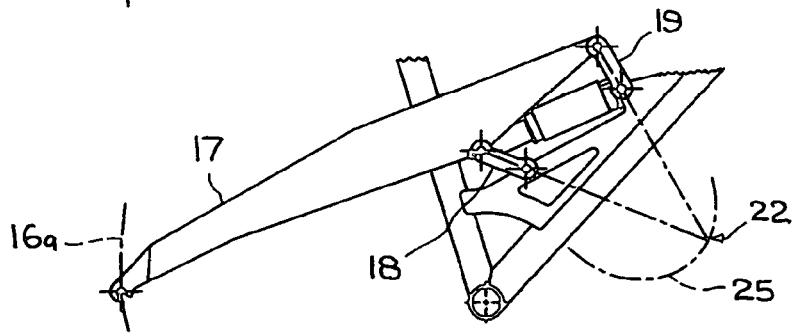
Figure 2C:
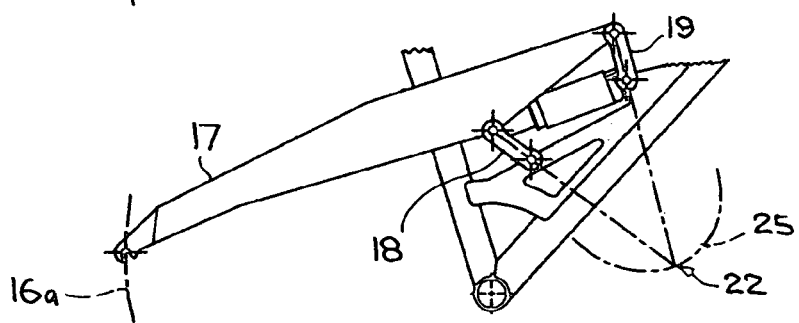
Figure 2D:
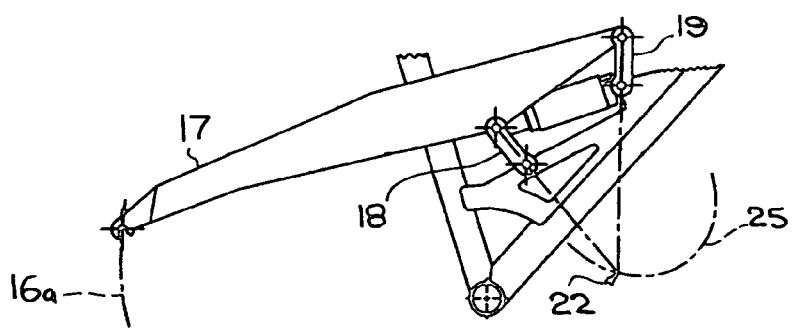
Figure 2E:
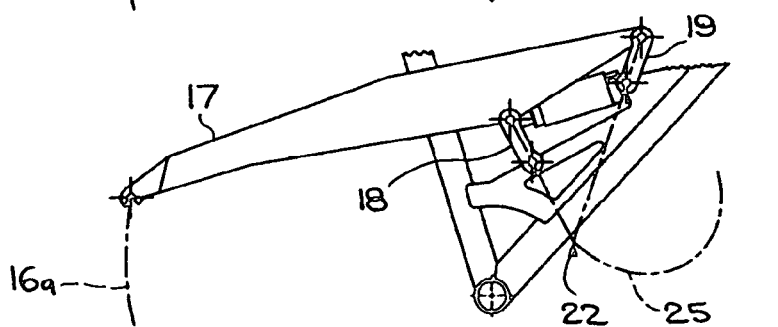

The locus, which is denoted by 25, of the instantaneous pivot centre 22 under upward pivotation of the swing arm 17 is evident from the five diagrams of FIGS. 2a to 2e, which illustrate different positions of the swing arm in the course of such pivotation and thus different settings of the four-bar linkage between its first end setting (FIG. 2a) and second end setting (FIG. 2e). As shown, the pivot centre 22 moves—in a direction rearwardly from its foremost position—along a curved path extending downwardly and rearwardly and then, with a transition at the point of over-centring of the forward link 18, along a continuation curved path extending upwardly and rearwardly. This course of movement of the instantaneous pivot centre 22 optimises change in chain length, so as to counteract bobbing, at least in the important initial phase of the suspension linkage movement in the direction of its second end setting. Compromise in the disposition of the links 18 and 19 due to accommodation of the spring and damper unit 21 within the linkage and to constraints that may be imposed by use of a non-optimised, commercially available unit 21 have the consequence that the wheel to spring/damper ratio could disadvantageously decrease in the final phase of the linkage movement into the second end setting. During this phase, however, an increase in the ratio is produced by lowering of the forward end of the spring arm 17 following the over-centre transition of the forward link 18. The consequent upward displacement of the pivot centre 22 in the final phase of the linkage movement allows undesired growth in chain length towards the end of the movement, but this stage of suspension movement, which normally results from suspension deflection by a large bump, is less likely to coincide with a rider power stroke. Minimisation of change in chain length is thus less critical as the linkage nears its second or fully loaded end setting.

A bicycle embodying the invention, thus a bicycle incorporating a rear wheel suspension as described in the foregoing, combines a sturdy wheel-carrying structure with an economic and compact construction of the suspension elements inclusive of spring and damper unit.

What is claimed is:

1. A bicycle comprising a frame, a rear wheel and a rear suspension, which suspension comprises a swing arm carrying the wheel, two pivot links pivotably connected at respective pivot points with the frame and at respective pivot points with the arm to form together with the frame and the arm a four-bar linkage comprising the two pivot links, the frame and the arm, and a spring and damper unit pivotably connected with the frame at the pivot point of one of the links at the frame and with the arm at the pivot point of the other one of the links at the arm to so extend diagonally of the linkage as to influence relative movement of the frame and arm, one link being disposed forwardly of the other link with respect to the fore and aft direction of the bicycle.

2. A bicycle as claimed in claim 1, wherein said forwardly disposed link is that sharing its frame pivot point with the spring and damper unit.

3. A bicycle as claimed in claim 1, wherein each of the pivot points comprises a single continuous pivot pin.

4. A bicycle as claimed in claim 3, wherein the pivot pins are substantially identical.

5. A bicycle as claimed in claim 1, wherein the links are substantially identical.

6. A bicycle as claimed in claim 5, wherein each link comprises two substantially parallel arms.

7. A bicycle as claimed in claim 6, wherein the spring and damper unit extends between said arms of each link.

8. A bicycle as claimed in claim 1, wherein the links and the spring and damper unit are disposed substantially in a space partly or fully enclosed by the frame.

9. A bicycle as claimed in claim 8, wherein the frame comprises a down tube and a seat tube and said space is a region between the tubes.

10. A bicycle as claimed in claim 9, wherein the frame comprises a bridge member extending between the tubes, and the pivot points at the frame are disposed on the bridge member.

11. A bicycle as claimed in claim 1, wherein the four-bar linkage is so arranged that an instantaneous pivot centre thereof defined by an intersection of two axes each containing the pivot points of a respective one of the links moves on a curved path initially downwardly and rearwardly and subsequently upwardly and rearwardly with respect to the fore and aft direction of the bicycle during movement of the linkage from an end setting in an unloaded state of the rear suspension to an end setting in a loaded state of the rear suspension.

12. A bicycle as claimed in claim 11, wherein the forwardly disposed link during said movement of the four-bar linkage executes an over-center motion to cause a forward end of the swing arm to move upwardly and then downwardly.

13. A bicycle as claimed in claim 11, wherein the links extend convergently in a direction downwardly away from the swing arm.

14. A bicycle as claimed in claim 11, wherein the locus of the axis of the rear wheel during movement of the four-bar linkage from the end setting in said unloaded state to the end setting in said loaded state has the form of a curve with a radius which is greater in the latter end setting than in the former end setting.

* * * * *